United States Patent
Aduh et al.

(10) Patent No.: US 10,953,551 B1
(45) Date of Patent: Mar. 23, 2021

(54) SOFT ACTUATOR AND GRIPPER ASSEMBLY

(71) Applicant: Amazon Technologies, Inc., Seattle, WA (US)

(72) Inventors: Erica Aduh, Cambridge, MA (US); Gregory Coleman, Somerville, MA (US); Andrew Marchese, Acton, MA (US); Beth Marcus, North Reading, MA (US); Manikantan Nambi, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/201,382

(22) Filed: Nov. 27, 2018

(51) Int. Cl.
*B25J 15/00* (2006.01)
*B25J 15/06* (2006.01)
*B25J 15/12* (2006.01)

(52) U.S. Cl.
CPC ....... *B25J 15/0023* (2013.01); *B25J 15/0616* (2013.01); *B25J 15/12* (2013.01)

(58) Field of Classification Search
CPC ............... B25J 15/0023; B25J 15/0616; B25J 15/0683; B25J 15/0691; B25J 15/12; B25J 9/142
USPC .............. 294/185, 189, 99.1, 86.4, 119.3
See application file for complete search history.

(56) References Cited

U.S. PATENT DOCUMENTS

| | | | | |
|---|---|---|---|---|
| 3,343,864 A | * | 9/1967 | Baer | B25J 15/0023 294/119.3 |
| 3,913,307 A | * | 10/1975 | Cardinal, Jr. | A01D 46/005 56/328.1 |
| 3,981,528 A | * | 9/1976 | Andorf | B25J 15/0023 294/119.3 |
| 5,568,957 A | * | 10/1996 | Haugs | B25J 15/12 294/119.3 |
| 6,484,601 B1 | * | 11/2002 | Arrichiello | B25J 9/14 294/106 |
| 7,258,379 B2 | * | 8/2007 | Ono | B25J 9/142 294/119.3 |
| 9,687,362 B2 | * | 6/2017 | Mosadegh | A61F 2/68 |
| 9,981,377 B2 | * | 5/2018 | Morin | B25J 9/1075 |
| 2003/0110938 A1 | * | 6/2003 | Seto | B25J 9/142 92/92 |
| 2017/0036355 A1 | * | 2/2017 | Lessing | B25J 15/12 |

* cited by examiner

*Primary Examiner* — Dean J Kramer
(74) *Attorney, Agent, or Firm* — BakerHostetler

(57) ABSTRACT

A soft actuator for a suction-cup end effector bends or deforms in response to air pressure within bladders in the actuator. The walls of the air bladders, upon pressurization, expand to contact adjacent structure, such as other expanding air bladders, to move a constraining layer of the actuator from a rest position toward an actuated position. A gripper for engaging items is formed by the soft actuator and a suction cup.

18 Claims, 10 Drawing Sheets

SOFT ACTUATOR AND GRIPPER ASSEMBLY

BACKGROUND

The present disclosure relates to robotics, and more particularly actuators for end effectors.

In general, end effectors used in automated processes are categorized into impactive, which often use jaws or claws that contact and grasp an object; ingressive, which includes pins or the like to penetrate the surface of an object; astrictive, which work by vacuum or magneto-adhesion or the like; and contigutive, which work by an adhesion process, such as gluing or surface tension.

In commercial warehouses, such as fulfillment centers and like facilities, automated processes often employ impactive and astrictive end effectors to handle a vast variation in the shape, size, and mass of objects, as well as to handle randomly oriented objects. An example of a modern air-actuated end of arm tool is an air-actuated finger assembly in which each curved finger has upstanding air chambers. When the air chambers are pressurized, the curvature of the finger decreases, which causes the fingers to move relatively inwardly to grasp an object

DETAILED DESCRIPTION

Figure 17:
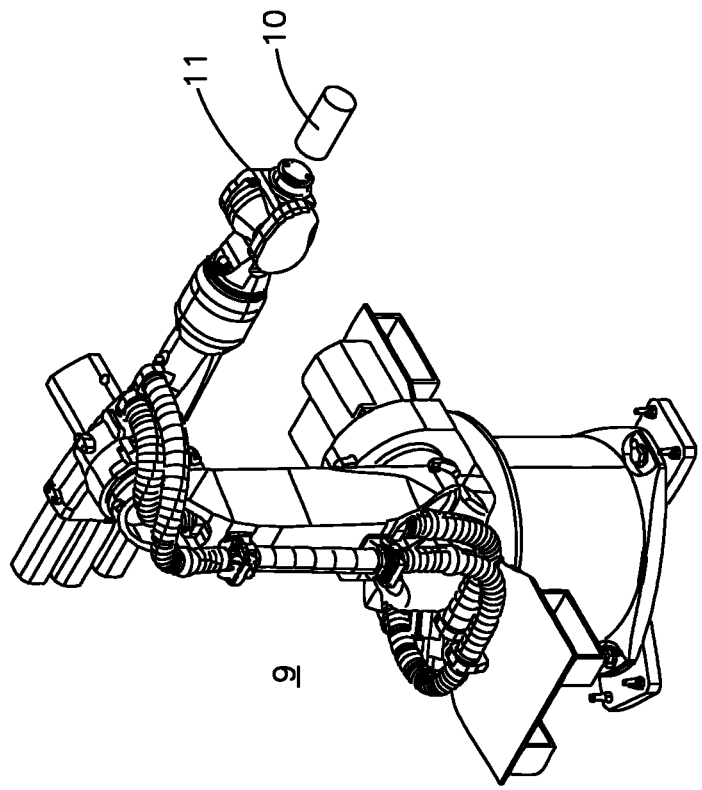
FIG. 17 is an illustration of a robot that can employ the components of the present invention.

A robot, such as a gantry or a six axis robot 9 illustrated in FIG. 17, includes an end effector 10 that is capable of grasping an object, and at least in some cases the end effector at least partially adapts or conforms (in shape) to the object to enhance gripping. A gripper includes a soft actuator that deforms or bends in response to air pressure within adjacent air bladders and a suction cup assembly that includes a pliable suction cup body having a distal end adapted for contacting the object and a proximal face or end.

The soft actuator includes a constraining layer having a rest position and an actuated position, and a complaint air bladder assembly including elongate air bladders located above the constraining layer. Each air bladder, upon pressurization, is configured to expand to contact a wall of the air bladder assembly for moving the constraining layer from the rest position toward the actuated position, which may be arcuate (that is, when viewed from the side) or substantially flat. At least one of the constraining layer and the air bladder assembly is resiliently adapted for moving the constraining layer form the actuated position release of air pressure from the air bladders. In this regard, the actuator returns to its rest position, such as the constraining layer being planar, upon release of air pressure from the air bladders. Perfect flatness is not required for the surface to be planar, as used herein.

In an embodiment, the constraining layer, in the rest position, has the shape for a circular disk, and the air bladders are oriented along chords of a circle defined by the disk. The constraining layer lower surface may include a surface or cover suitable for contacting the suction cup assembly.

The air bladders can be connected by a common plenum that can be formed between the constraining layer and the air bladder structures and connected to a compressed air inlet. The air bladders can be formed by an air chamber between opposing elongate walls that are adapted for outward expansion (such as bulging) upon pressurization. The inboard wall of each air bladder can be configured and positioned relative to adjacent air bladders such that, upon outward deflection, the air bladder contacts the expanded wall of an adjacent air bladder. In this regard, the expanded (bulged) outboard wall contacts the expanded (bulged) inboard wall of an adjacent air bladder. Or the expanded air bladder wall can contact another surface, such as an unexpandable wall, the structure of an attachment fitting, or the like.

The air bladder elongate walls may be mutually parallel in the rest position and include a cap at an upper end of the walls of the air bladder for sealing the upper end of the air chamber such that each air bladder forms an inverted U-shape in the rest position. The air bladders are oriented along chords of a circle defined by the disk. Thus, the air bladders can be separated by chordal slots (when the actuator is circular). The air bladder assembly can be formed of a unitary material, preferably a hyper-elastic material or elastomeric material, and that is itself adhered to the constraining layer, which may also be formed of the elastomer. An intermediate structure (not shown) of any type can be between the constraining layer and the air bladder, consistent with the function explained herein.

A robotic end of arm tool gripper can employ the soft actuator. The soft actuator can work with many gripper components, such as a suction cup assembly that defines an aperature through which a vacuum may be applied. The suction cup assembly, which may have a ring-like shape, is configured to be at least initially moved from a rest position by movement of the actuator. The suction cup assembly in this illustrative embodiment can conform to and grasp an object upon application of vacuum to the suction cup assembly. The constraining layer may include a contact surface adapted for contacting an upper surface of the suction cup assembly.

In some cases, the constraining layer is not affixed to the suction cup assembly, and the suction cup assembly is adapted to resiliently return to its rest position upon release of the vacuum to the suction cup assembly independent of the resilience of the actuator. In an specific example, the suction cup assembly comprises a flat, resilient ring; a foam cup attached to the ring; and a planar, flexible membrane attached to the ring and extending radially inwardly from the ring. The suction cup assembly is configured to resiliently return to its rest state upon disengagement with the object. The flat, resilient ring may bias the foam cup of the suction cup assembly toward the rest position. Alternatively, the foam cup of the suction cup may be biased in other positions, such as a concave/actuated or convex/retracted position. For example, in a retracted position may enable a smaller contact area of the suction cup. Each one of the soft actuator and the suction cup assembly may include a center aperture through which a fitting can extend to join the gripper to an end of arm tool. Perfect flatness is not required for the surface to be planar, as used herein.

A method of grasping an object can use the actuator and the suction cup assembly (or other structure that can benefit from the action of the bending of the actuator). The method can include positioning the gripper relative to an object while each one of the soft actuator and the suction cup assembly are in a rest position; pressurizing air bladders of the actuator such that the actuator constraining layer bends to contact an upper surface of the suction cup assembly, thereby promoting bending of the suction cup assembly; and applying vacuum to an interior of the suction cup assembly such that the suction cup assembly conforms to and grasps the object by vacuum. In this regard, the constraining layer restricts radial, planar deformation (that is, increase in diameter) such that the bending moment applied by the air bladder forces, such as against adjacent air bladders or adjacent walls, bends the constraining layer according to a predetermined profile. The radial constraining function can be achieved by the structure of the constraining layer, and/or may be formed by a material that is less extensible that that of the air bladder material.

Then, the method can include lifting the object after the step of pressurizing the air bladders and applying vacuum to the suction cup or like gripper; and releasing the pressure in the air bladders and releasing vacuum in the suction cup assembly, thereby (i) releasing the object and (ii) enabling the actuator to resiliently return to the rest position and enabling the suction cup assembly to resiliently return to the rest position independently from the resilient return of the actuator to the rest position.

Referring to FIG. 17, a robotic gripper 10 is mounted to an arm 11 of a robot 9. Other means for positioning robotic gripper 10 are contemplated, and the invention is not limited to any particular positioning means unless specified in the claims. A pressurized air source and a vacuum source (not shown in the figures) are supplied to gripper 10.

Gripper 10 includes a soft actuator 110 that includes a lower constraining layer 120 and an air bladder assembly 140. In the embodiment shown in the FIG. 2 through FIG. 6 for a first embodiment actuator 110, constraining layer 120 in its rest position is a circular disk that has a planar underside surface 122. Air bladder assembly 140 preferably is adhered to constraining layer 120 such that constraining layer 120 and the air bladder assembly 140 are an integral unit. Underside surface 122 may have layer, such as a Cordura Nylon, to enhance friction and/or resist deformation.

Air bladder assembly 140 includes air bladders 150. Reference number 150 is used to refer to the air bladders or any one of the air bladder generally, and an appended letter, such as air bladder 150a or 150b, is used to refer to a particular one of the air bladders.

Figure 1:
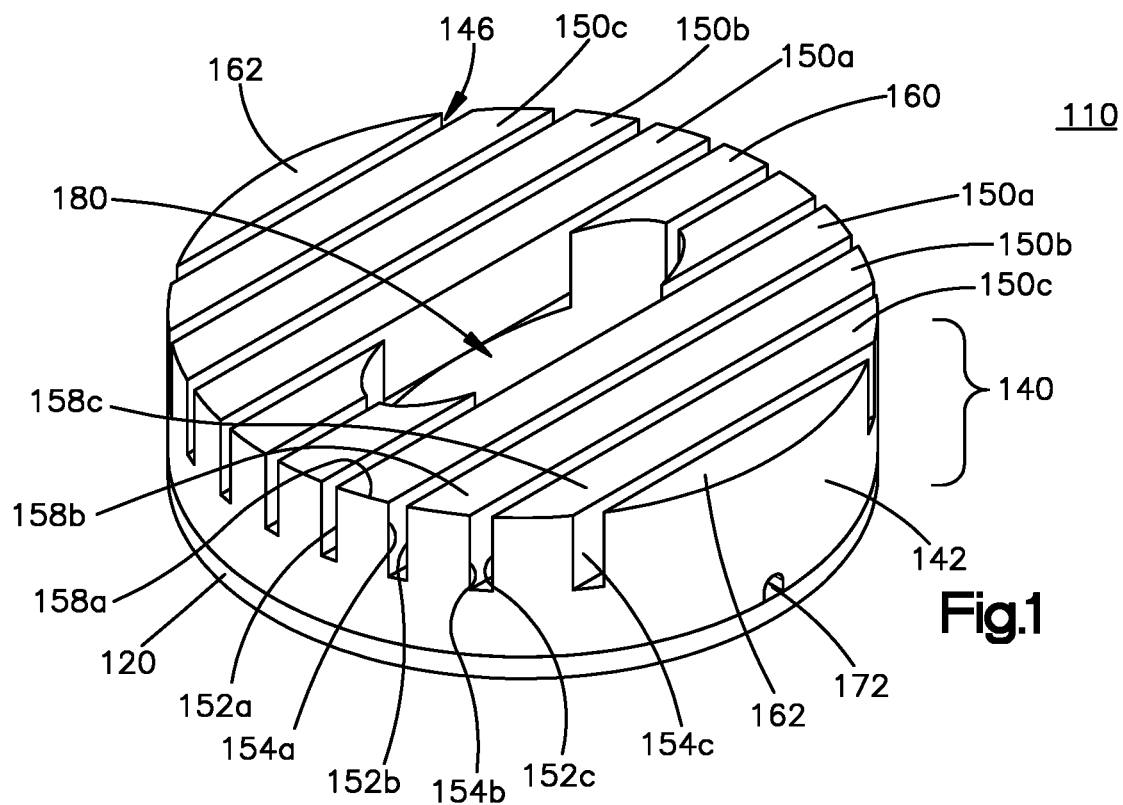
FIG. 1 is a top perspective view of a first embodiment soft actuator shown in the rest position and illustrating aspects of the present invention.
Figure 2:
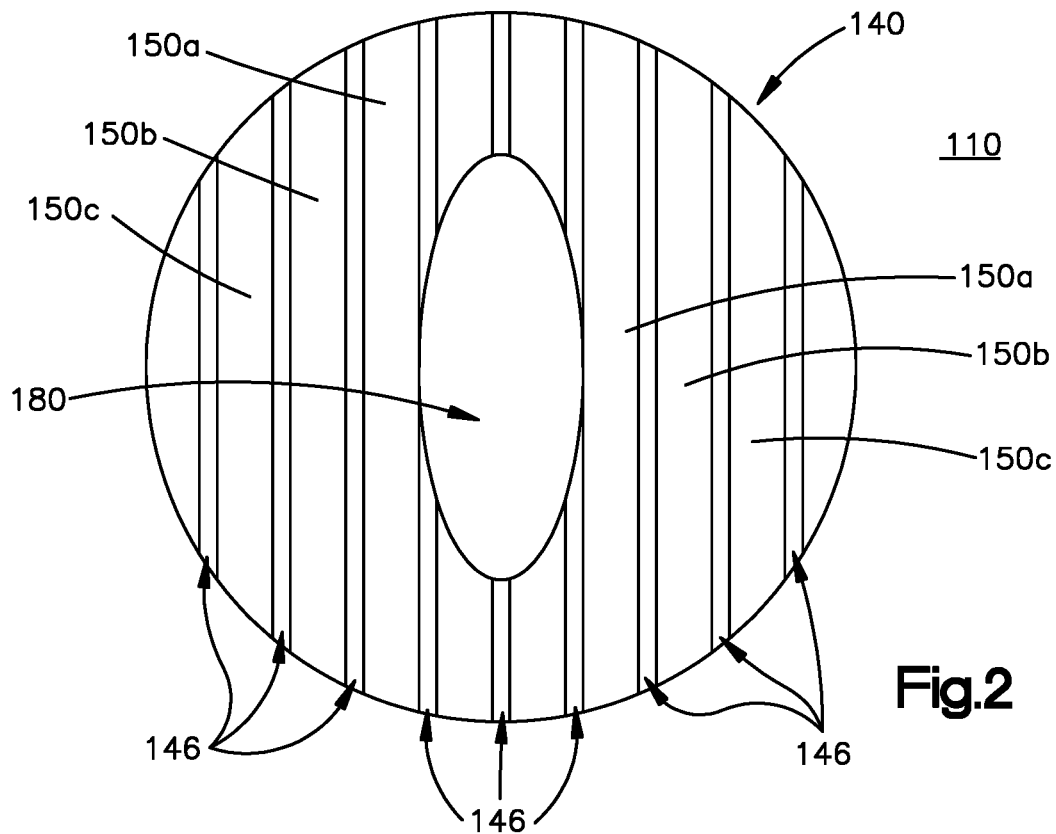
FIG. 2 is a top view of the first embodiment actuator.
Figure 3A:
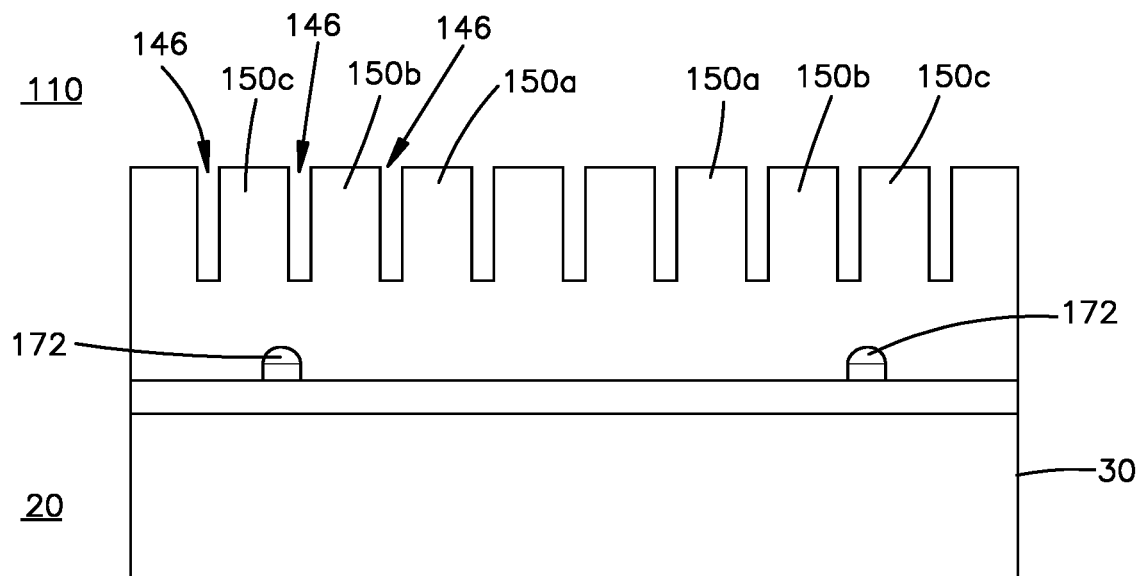
FIG. 3A is an enlarged view of the actuator of FIG. 1 together with a suction cup, illustrated in the at rest, un-actuated position.
Figure 3B:
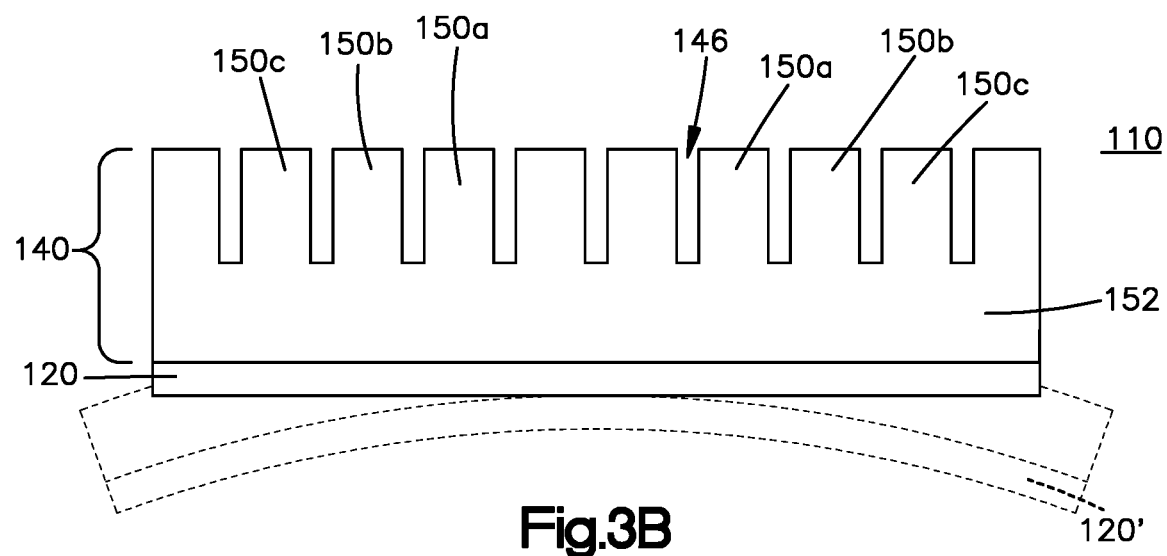
FIG. 3B is a side view of the actuator of FIG. 1, with a schematic illustration of the actuator in an actuated position.
Figure 4:
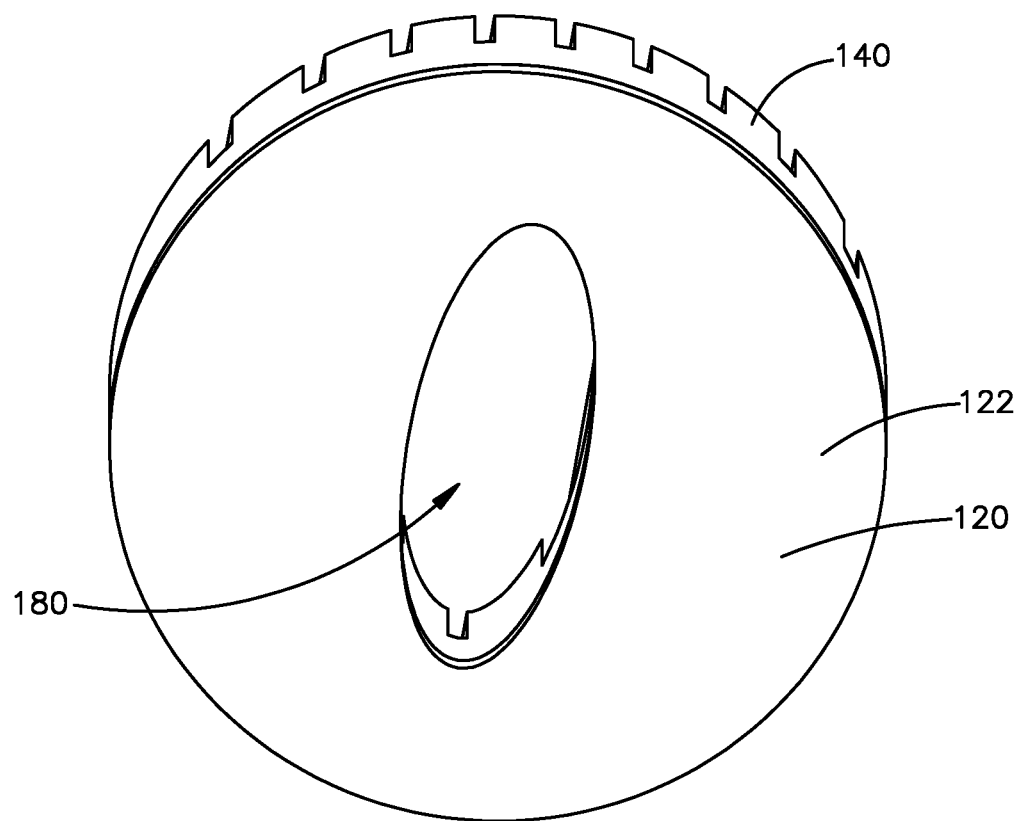
FIG. 4 is a bottom perspective view of the actuator of FIG. 1.
Figure 5:
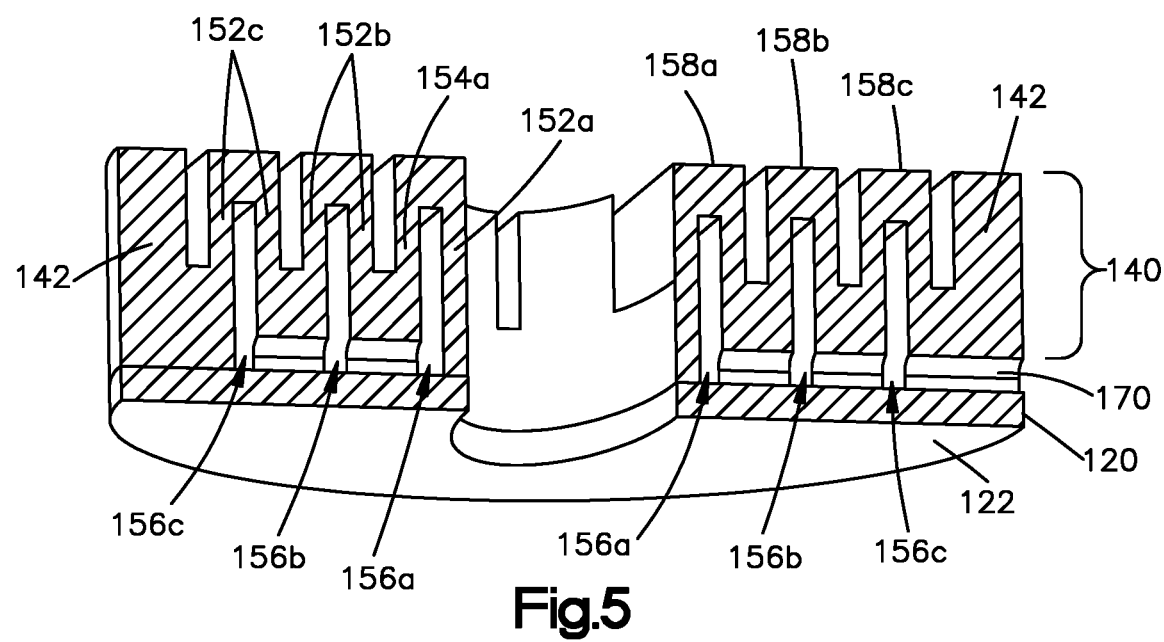
FIG. 5 is a transverse cross-sectional view of the actuator of FIG. 1.

Air bladders 150 are upstanding relative to constraining layer 120 and separated by slots 146 that have the geometric shape of a 3D projection of chords drawn on a circle defined by constraining layer 120. Thus, the air bladders in the embodiment of FIG. 2 are parallel and chordal. In the figures, the slots are vertical when the actuator is in the rest position. Other orientations of the slots, such as inclined from vertical and not mutually parallel, are contemplated.

As illustrated in the figure, the air bladders in the figures are symmetrical about a centerline that is parallel with the air bladders and parallel with slots through the center of actuator 110. As best illustrated in the cross-sectional views, each air bladder 150 is formed by opposing, upstanding walls, including an inboard wall 152 and an outboard wall 154, that define an air chamber 156 between the walls. Each air chamber 156 is a space that is connected by one or more plenums 170 to others of the air chambers 156 and that lead to a compressed air inlet 172. Thus, only one or two air inlets are required to pressure all the air bladders. The top of each air bladder is covered by a cap 158 that extends between walls 152 and 154, thus sealing the air chamber 156.

In the embodiment of FIG. 2 through FIG. 6, actuator 110 has an elongated aperture 180 at the center that extends through air bladder assembly 140 and constraining layer 120. Air bladders 150 are outboard of aperture 180 on each long side of the aperture. A first air bladder 150a on each side of aperture 180 includes inboard and outboard walls 152a and 154a, second air bladders 150b have inboard and outboard walls 152b and 154b, and third air bladders 150c have inboard and outboard walls 152c and 154c. Air chambers 156a, 156b, and 156c are defined in the respective air bladders between the respective walls.

Figure 6:
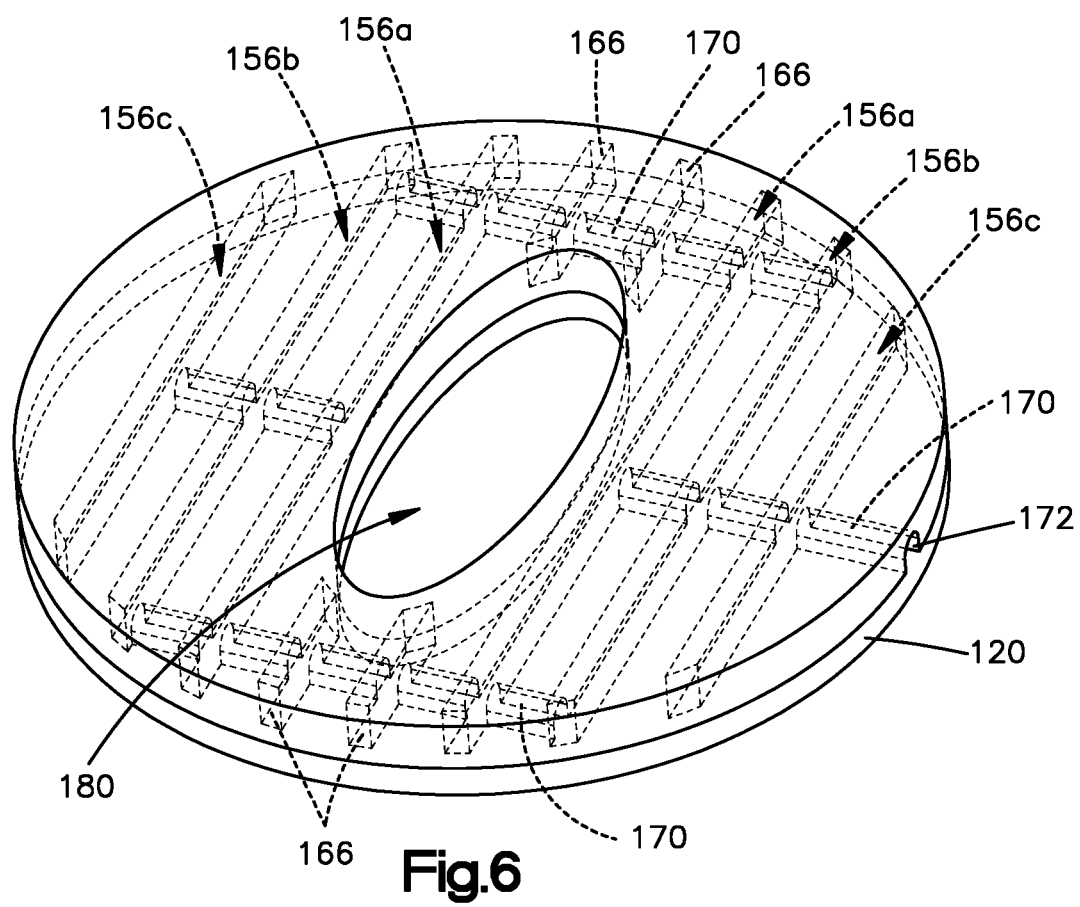
FIG. 6 is a horizontal cross-sectional view of the actuator of FIG. 1.

The partial chordal portions 160 on opposing ends of aperture 180 and inboard of first air bladders 150a may include air bladders 166 (as illustrated in FIG. 6) including air chambers and function as explained with respect to air bladders 150 (described below). The effect bulges of the inboard walls of chordal portions 160 is to have an outwardly directed force the created a moment at the bending axis of constraining layer 120.

Outermost portions 162 (that is, outboard of the outboardmost chordal groove 146) may be an elastomer or solid hyper-elastic material as illustrated in FIG. 6, or alternatively portions 160 can include an air chamber and function as described for air bladder 150 (not shown in the figures).

Plenum 170 can take any structure that communicates pressurized air among the air bladders from one or more air inlets 172.

Figure 7:
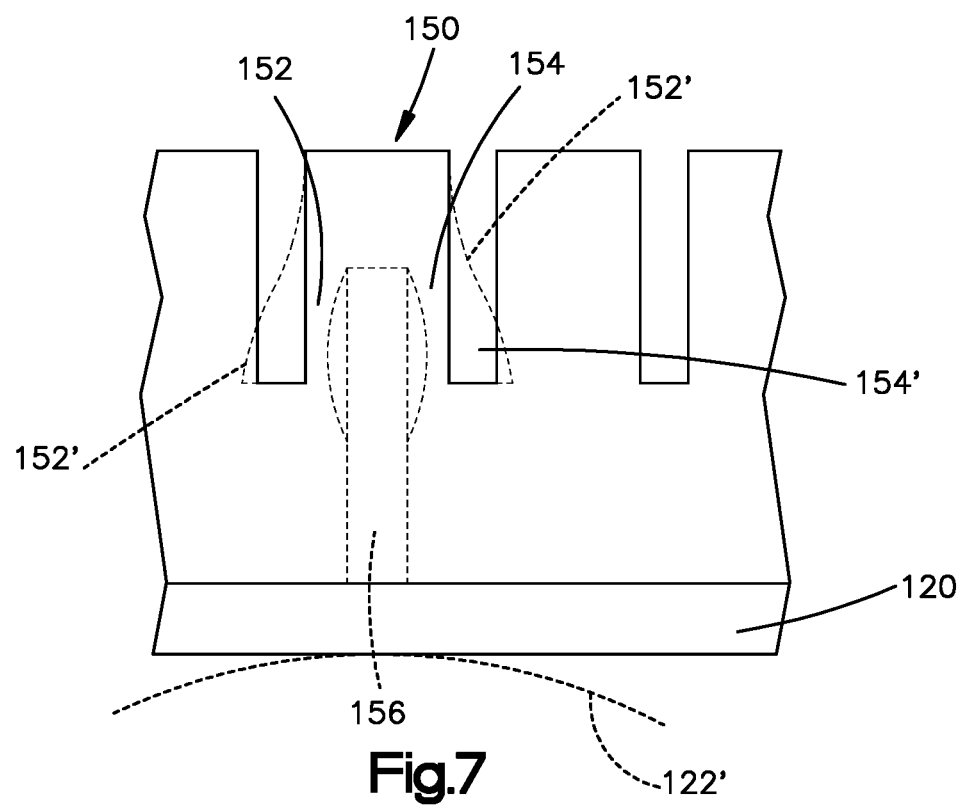
FIG. 7 is an enlarged portion of the air bladder assembly and constraining layer of the actuator of FIG. 1, schematically illustrating operation of an air bladder.

FIG. 7 is a schematic illustration of the function of actuator 110. Upon pressurization of the air chamber of an exemplary air bladder 150, inboard wall 152 and outboard wall 154 expand outwardly to form an inboard bulge 152' and an outboard bulge 154', respectively. As illustrated, bulges 152' and 154' expand the face of the walls to the extent that each bulge contacts and presses against the adjacent walls, and creates an outward force on the adjacent wall. FIG. 7 schematically illustrates the magnitude of the bulges 152' and 154' by dotted lines.

The force created by the bulges against the adjacent walls create a bending moment in constraining layer 120 that tends to bend or deflect the actuator, as schematically illustrated by the dashed line 122', which represents constraining layer underside surface 122 upon deflection by the expanded air bladder 150. The magnitude of bending is greater if the wall adjacent to wall 152' and the wall adjacent to wall 154' each are walls of an air bladder, which expanded wall is illustrated on the right side of air bladder 150 by a dot-dash-dot line. For example, in FIGS. 2 through 6, air bladder 150*b* is between air bladders 150*a* and 150*c*. Upon pressurization, inboard air bladder wall 152*b* would expand to form a bulge and contact the bulge of adjacent outboard wall 154*a*. And outboard air bladder wall 150*b* upon bulging would contact the bulge of expanded inboard wall 152*c*. The effect is to apply a force, and thus a bending moment on the constraining layer, at each contact point. FIG. 6 illustrates the effect of the forces by showing a schematic representation of constraining layer 120 in its actuated state as reference number 120'. The shape of constraining layer 120' can have any curvature or combination of curvatures and/or straight portions, which shapes are referred to herein as arcuate.

To form actuator 110, air bladder assembly 140 can be molded or formed by other method of a pliable and resilient material, such as a hyper-elastic material. Other, elastomeric materials such as latex, rubber, and silicone may be used. Other materials are contemplated. Constraining layer 120 may be formed of the same or other material as that of the bladder assembly 140. The two parts can be joined together by an adhesive or other known means for joining the particular materials chosen.

The choice of material, shape of the constraining layer 120, shape and dimensions of the air bladder assembly overall, dimensions and locations of the air chamber, dimension and locations of the walls opposing the air bladder, and other parameters may be chosen together in order to achieve the desired functional properties of the air bladder, such as magnitude of deflection, location of bending axis, shape of constraining layer upon deflection, and the like, upon pressurization.

The actuator is described herein as having a circular shape, especially at surface 122 of constraining layer 120. The present invention is not limited to actuators having any shape. For example, an actuator having a square, rectangular, oval, or polygonal shape may be employed, as required by the particular objects of the application. Further, the air bladders are described as elongate and are shown in the figures to be straight. The present invention is not limited to straight air bladders or elongate air bladders unless specified in the claims. Further, the air bladders are illustrated as having a rectilinear cross-sectional shape. The actuator is not limited to the rectilinear air bladder configuration, but rather encompasses of air bladders having any shape, such as triangles, inverted triangles, arcuate curves and like cross-sectional shapes.

For example, the following parameters may be chosen to yield the desired shape of the actuator (such as the constraining layer underside surface and the force and/or bending moment imparted by the actuator, and other desired attributes of the actuator) in the actuated position: the number and location of the air bladders, wall thickness of the opposing walls of the air bladders, dimension of the slots (that is, between adjacent walls), whether air bladders are side-by-side or separated by non-expanding solid portions, modulus of elasticity of the material, moment of inertia of the structure or other mechanical property associated with resistance to deformation, air pressure, thickness of the constraining layer, and other parameters that will be understood by persons familiar with air actuated grippers in view of the present disclosure.

Figure 8:
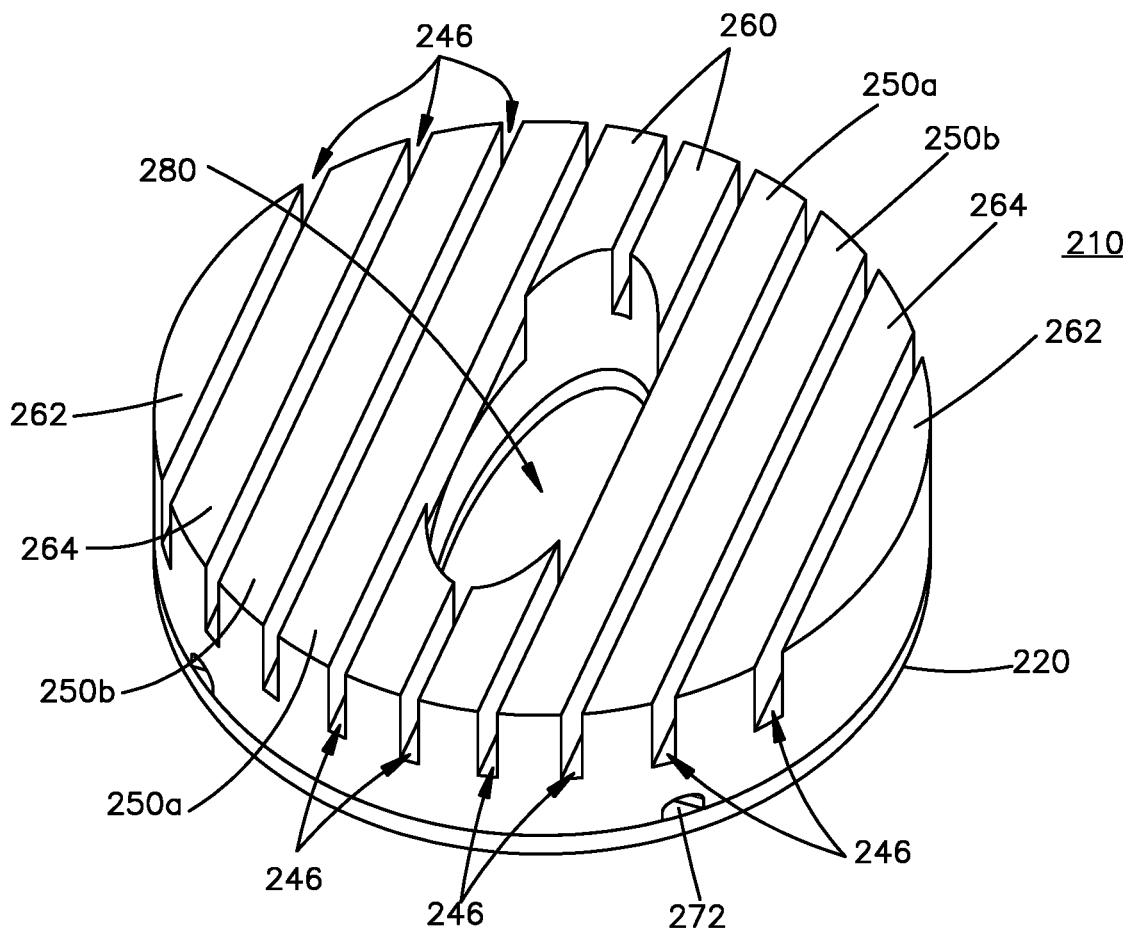
FIG. 8 is a top perspective view of a second embodiment soft actuator shown in the rest position and illustrating aspects of the present invention.
Figure 9:
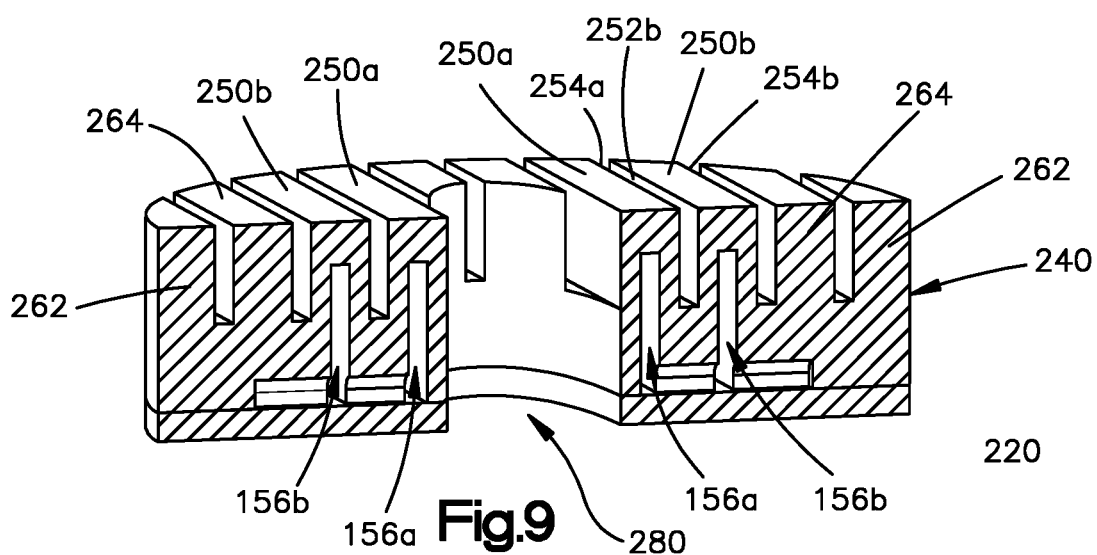
FIG. 9 is a transverse cross-sectional view of the actuator of FIG. 8.
Figure 10:
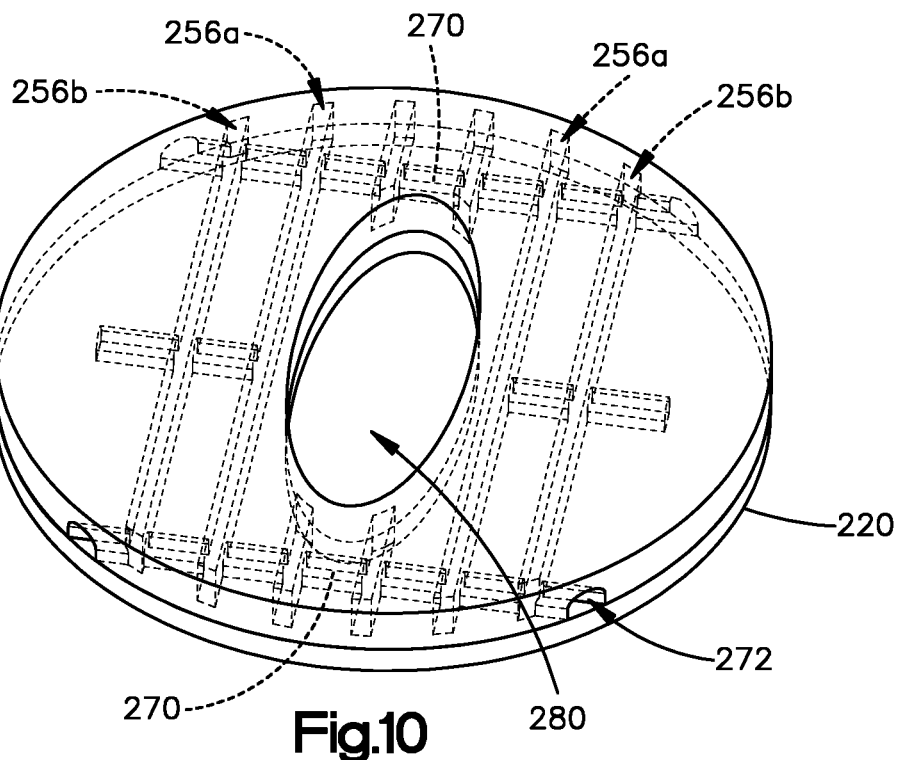
FIG. 10 is a horizontal cross-sectional view of the actuator of FIG. 8.

Referring to FIG. 8 through 10 to illustrate a second embodiment air bladder assembly, which includes air bladders 250. Reference number 250 is used to refer to the air bladders generally or as a whole, and an appended letter, such as air bladder 250*a* or 250*b*, is used to refer to a particular one of the air bladders.

Air bladders 250*a* and 250*b* have the structure and be formed of the same materials as described for first embodiment air bladders 150*a* and 150*b*, extending on opposing sides of an aperture 280, and portions 260 can have the same structure of first embodiment portion 160, which as described above can include air chambers that form a bulge in the corresponding air bladder wall. Aperture 280 can have the same structure as first embodiment aperture 180. The air bladders of second embodiment 210 can function the same way as described for the air bladders of first embodiment 110.

Second embodiment air bladder assembly includes an upstanding portion 262 that is outboard of the outboard-most chordal groove 246. The upstanding portion 262 does not include an air chamber and thus does not function as an air bladder, which is distinguished from the first embodiment 100, as the upstanding portion 262 is located in the place corresponding to the location of air bladder 150*c* in first embodiment actuator 110. Plenums 270 and constraining layer 220 may be as described for the corresponding structure of first embodiment actuator 160.

Solid (not expanding) portion 262 has an inboard solid wall that does not contain an air chamber and therefore does to expand or have bulges. Thus, the force applied between the expanded bulges from the outboard wall of air bladder 250*b* is reduced (or optionally eliminated) compared with a pair of air bladders, such as between the outboard wall 254*b* of air bladder 250*b* and inboard wall 252*c* of air bladder 250*c*. In this regard, constraining layer 220 may have less curvature (that is, a larger radius of curvature) at the distal ends of actuator 210 (that is, along axis perpendicular to a line bisecting aperture 280 longitudinally, and therefore bisecting outermost portion 260) than that of first embodiment 210. In some configurations, forgoing an air bladder in the outermost portion (such as solid portion 262) prevents the outermost tips of the actuator from going past vertical to restrict the opening in the actuator. In addition to the quantity and number of air bladders, other parameters may be chosen of affect the magnitude and shape of the bend of the constraining layer in the actuated position, as described above.

Figure 11:
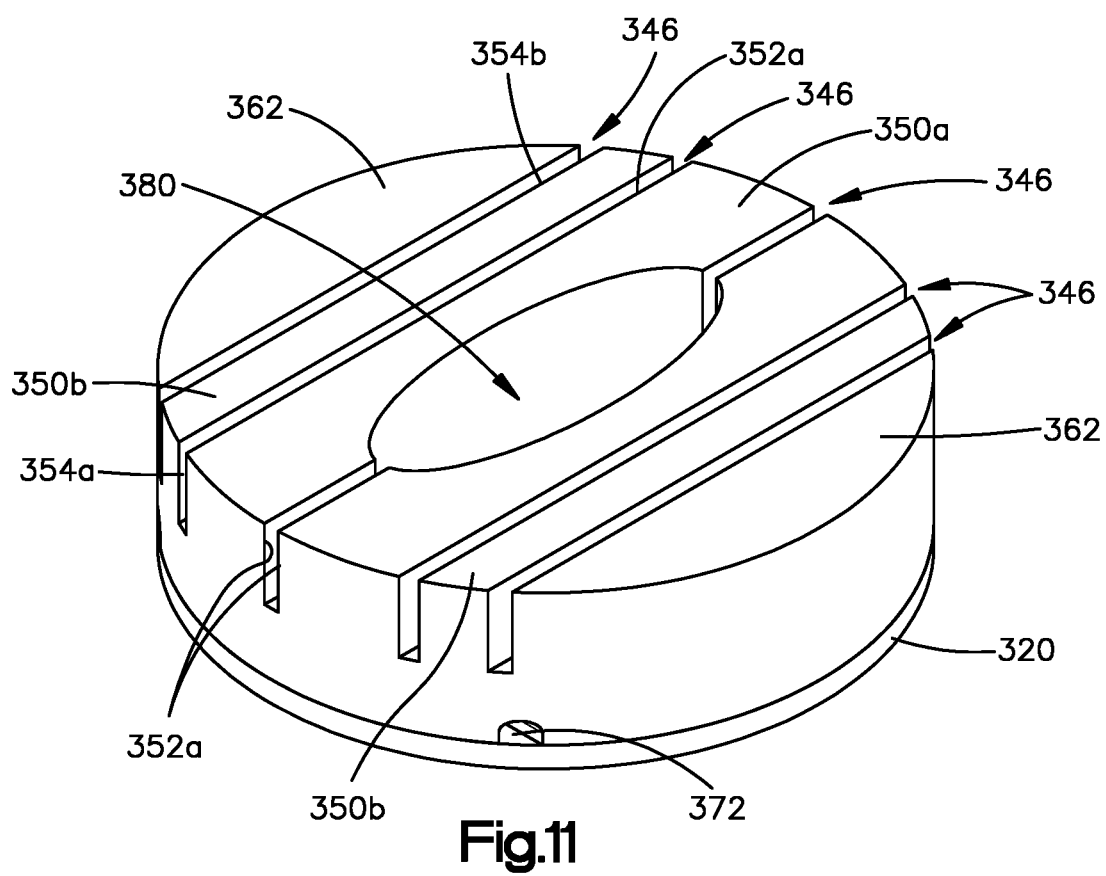
FIG. 11 is a top perspective view of a third embodiment soft actuator shown in the rest position and illustrating aspects of the present invention.
Figure 12:
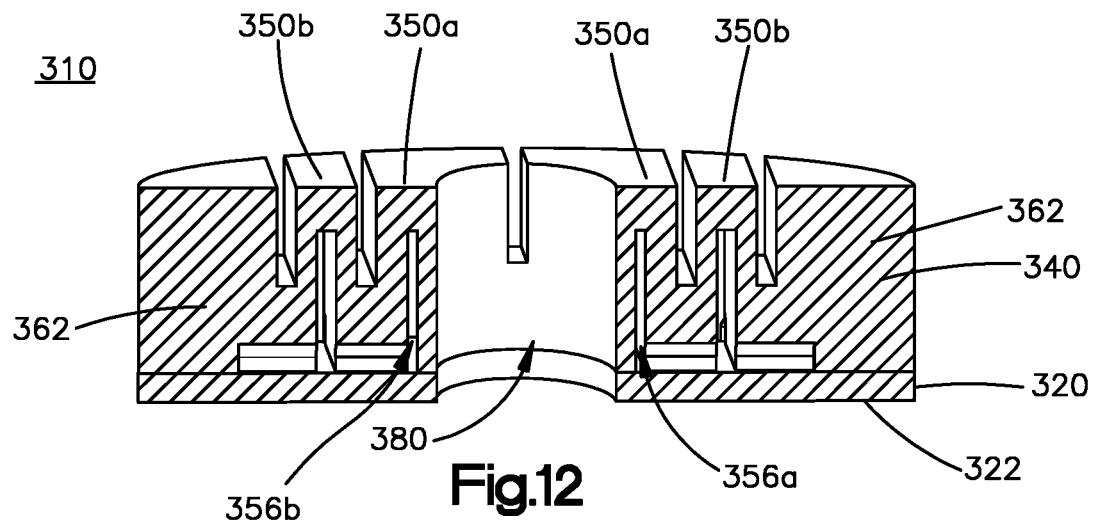
FIG. 12 is a transverse cross-sectional view of the actuator of FIG. 11.
Figure 13:
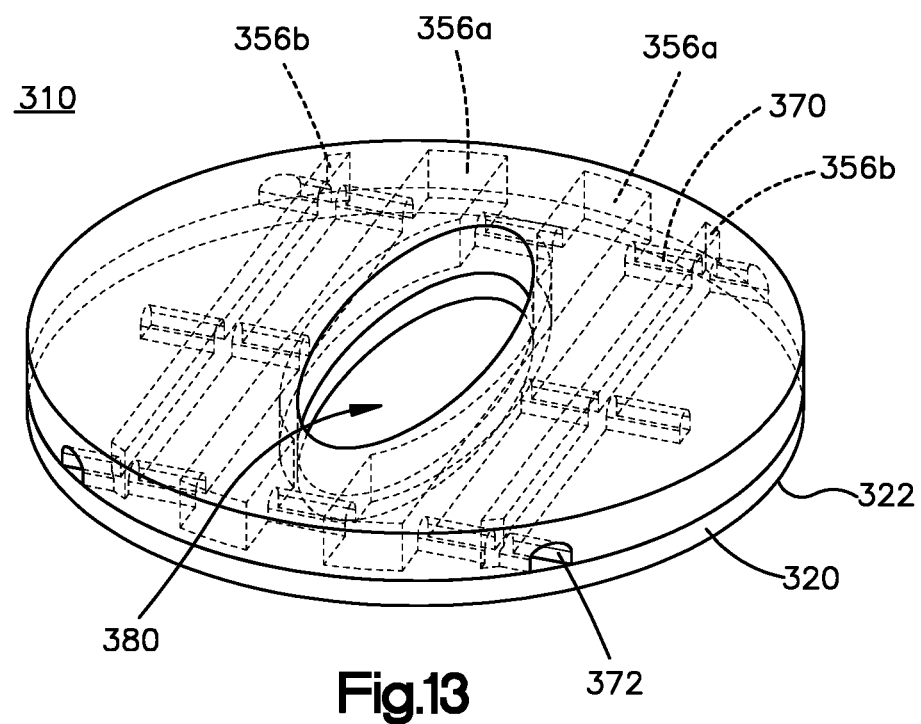
FIG. 13 is a horizontal cross-sectional view of the actuator of FIG. 11.

Referring to FIG. 11 through 13, a third embodiment air bladder assembly includes a constraining layer 320 and air bladder assembly 340, which includes air bladders 350*a* and 350*b*. Air bladders 350*a* include an air bladder portion that is adjacent the long side of an aperture 380 and that extends around aperture 380 past the ends of the aperture. In this regard, air bladder 350*a* can (conceptually and generally) be considered to be a combination of the air bladders 150*a* and 166 of the first embodiment.

Aperture 380 can have the same structure as first embodiment aperture 180. Air bladders of third embodiment 310, to the extent of the bulges impinge on the adjacent wall, can be as described for first embodiment 110. Air bladder assembly 340 includes an upstanding portion 362 that is as described for second embodiment portions 262. Plenums 370 and constraining layer 320 may be as described for the corresponding structure of first embodiment actuator 160.

Upon actuation, force is applied by the interaction of the expanded bulges from the inboard walls 352a of the partial chordal portions if air bladders 350a, between bulges of first air bladder 350a outboard wall 354a and second air bladder 350b inboard wall 352b, and between second air bladder 350b outboard wall 352b and the inboard wall of upstanding portion 362. Thus, the quantity of air bladders in actuator 310 is fewer than the quantity of air bladders in first actuator 110 with corresponding changes to the profile upon pressurization and actuation. In addition to the quantity and number of air bladders, other parameters may be chosen to affect the magnitude and shape of the bend of the constraining layer in the actuated position, as described above.

As an example of the kind of suction cup assembly that may be employed with the soft actuator, a pliable sealing bellow or sealing membrane is coupled to the ring and extends radially inwardly from the structural ring. A connector, which preferably is at the center of the suction cup in embodiments in which the suction cup is symmetrical, can be configured to attach to a vacuum port.

The suction cup assembly has a rest or unactuated state or position and an engaged or deformed state or position. In its rest position, the suction cup is in its conventional, flat position in which the contact surface of the suction cup is planar. Perfect flatness is not required for the surface to be planar, as used herein. Upon application of vacuum (preferably), or optionally upon actuation by actuators, such as linear actuators, the suction cup can deform to conform to the shape of an object. In this regard, in some embodiments the only actuation is application of vacuum pressure to the suction cup.

In general, the suction cup assembly is configured to conform to and grasp an object upon application of vacuum and (i) to be compliant such that it is conformable to the object upon application of vacuum, (ii) to lift an object after engagement, and (iii) to resiliently return to its rest state upon disengagement with the object. Thus, the resilient ring (in the embodiment of the figures) has the function of providing a structure that connects between the suction cup ring and the sealing membrane, of being resilient to spring bias the suction cup assembly to its rest position (which can be planar) and also sufficiently deformable to enable the foam to conform itself to the object (which can have a wide variety of shapes and sizes) and be strong enough to transmit the load from the suction cup to the membrane. At least the ring can be capable of bending about an axis. In the embodiments of the figures, the ring can deform about any axis, and can be isotropic in this regard (as defined below).

The suction cup in the embodiments shown in the figures can be any material, and preferably is a resilient foam, and has an aspect ratio, durometer, tensile strength, shear strength, and compression set and density to enable it to readily deform with the structural ring in response to the vacuum applied to its interior when in contact with or near an object, to enable it to conform to the shape of the object, to enable it to grip the object, and to enable it transmit the load from the object to the ring during lifting.

The membrane in the embodiments shown in the figures is flexible, preferably along any axis to enable it to readily deform with the structural ring and to enable it to transmit the load of the object from the ring to a connector that is affixes to an end effector (which phrase encompasses various structures and configurations, including indirect coupling).

Thus, the structural ring can be made of a resilient material to supply a spring force to bias the suction cup assembly to the rest position, such that after release of the item and release of the vacuum pressure, the suction cup assembly returns to its rest position. The terms "pliable" and "compliant" as used herein refer the property of being easily elastically deformed. The term "resilient" as used herein refers to the property of being deformable and then, upon release of the deforming force, returning to its undeformed, rest position.

The sealing bellows or membrane may be formed of a pliable material that provides an air seal (which term "seal" encompasses an imperfect sealing material or sealing configuration that merely inhibits air leakage). The connector may be of any type, such as an elastomer or other flexible or inflexible grommet or nipple of any configuration. The suction cup assembly may have isotropic stiffness in the plane defined by the structural ring while the suction cup assembly is in the rest position. In this regard, the stiffness of the suction cup assembly is the same regardless of the axis of bending (in the plane of the suction cup). Preferably, the sealing bellows or sealing membrane is planar.

The structural ring can be formed of a spring steel or a flexible polymer, such as a urethane, an ethyl vinyl acetate (EVA), a polyurethane, a thermoplastic urethane (TPU), moldable or extrudable polymers such as thermoplastic elastomers (TPEs), thermosets such as liquid-injection-molded (LIM) or compression molded silicone or other material, depending on the desired functional aspects of the suction cup, and other parameters, such as diameter, magnitude of vacuum pressure, whether biasing springs are employed, and like parameters, as will be understood by persons familiar with suction cup technology in view of the present disclosure.

The suction cup body can be formed of a pliable material, such as a material comprising an open cell rubber sponge. For example, the suction cup body may include moldable and/or extrudable polymers. The structural ring will typically be stiffer, and in some embodiments have at least twice the stiffness, of the soft, deformable foam.

Figure 14:
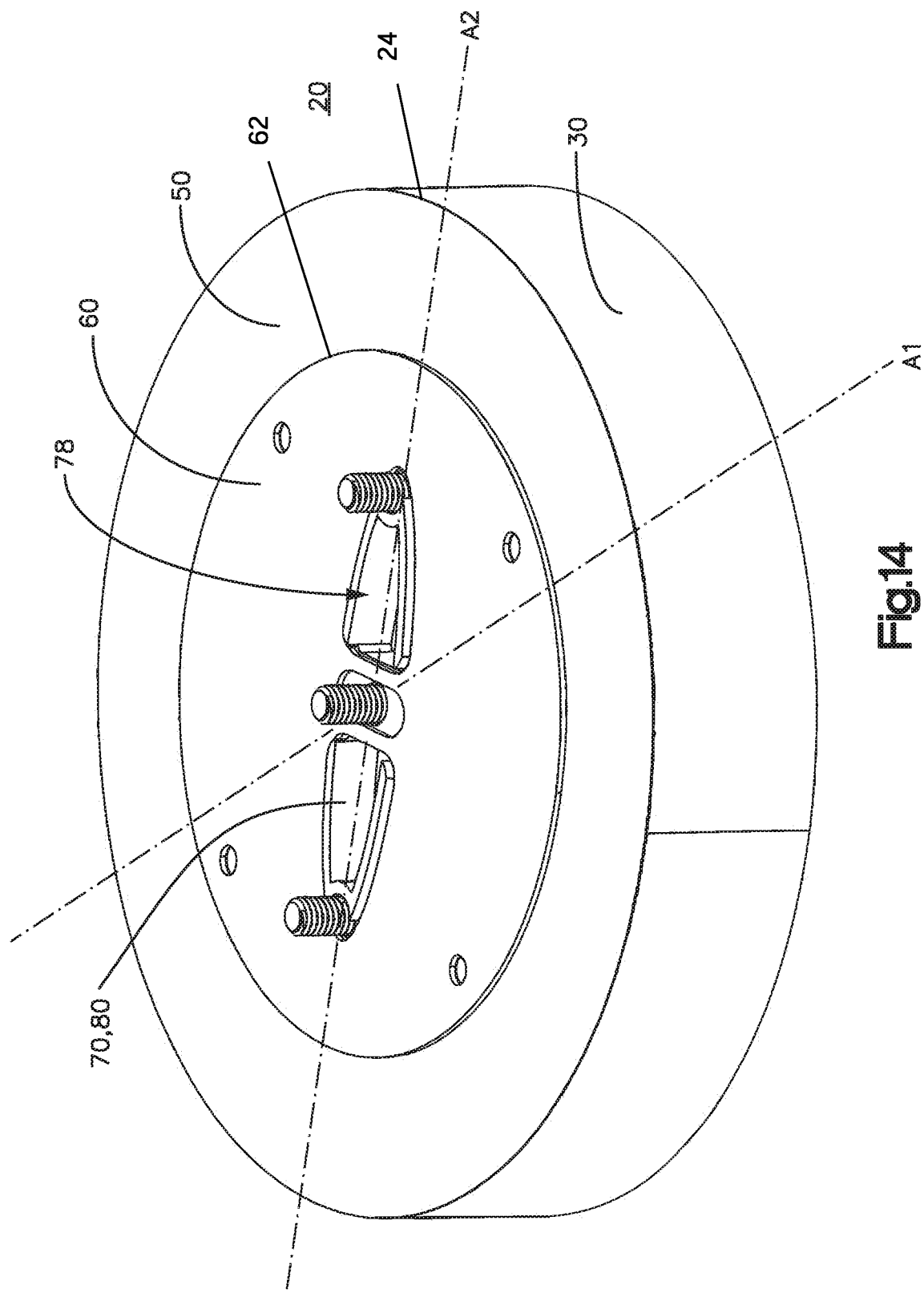
FIG. 14 is a perspective view of a suction cup assembly of a type that may be used with the actuators described herein.
Figure 15:
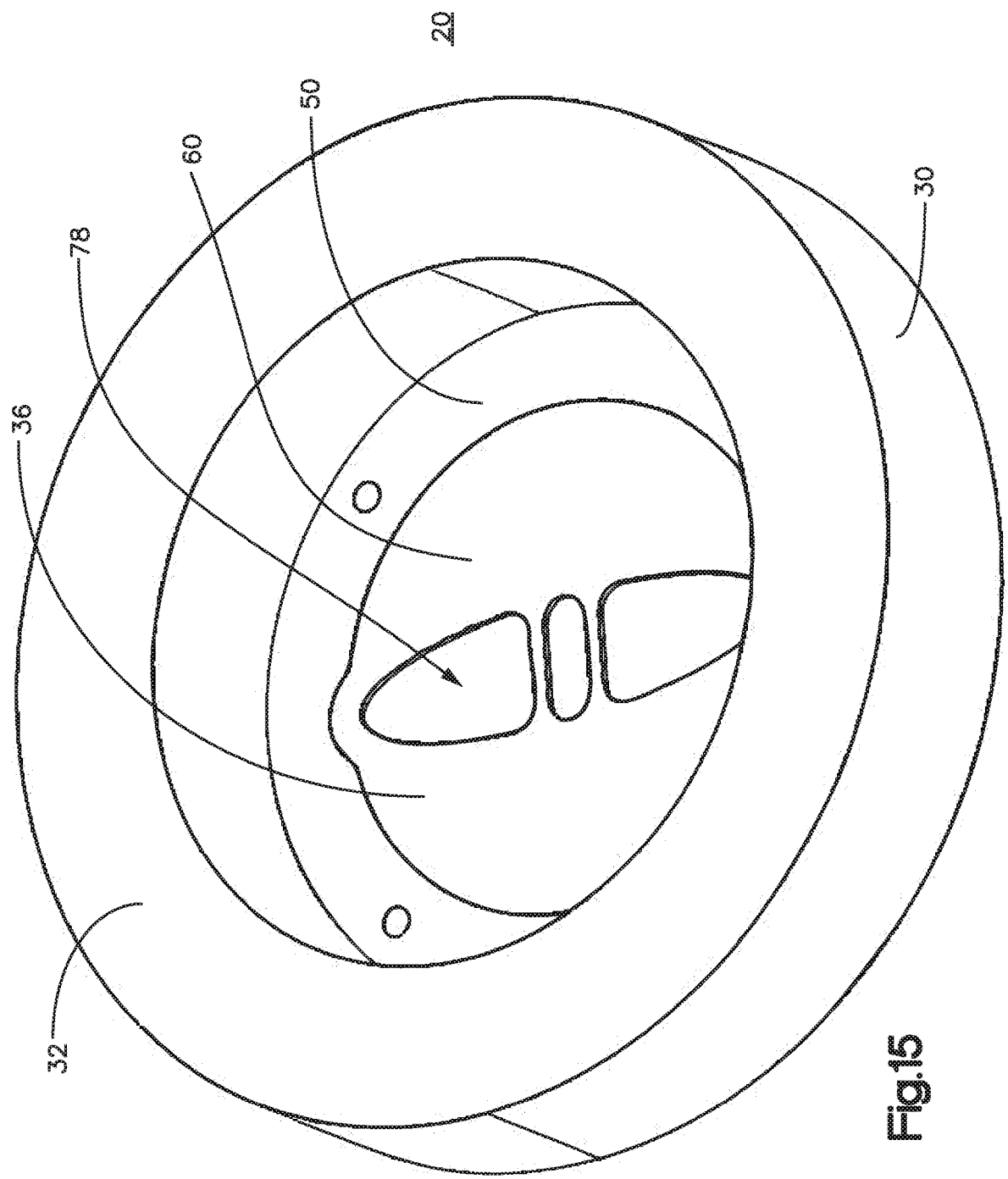
FIG. 15 is perspective, cross-sectional view of an underside of the embodiment of FIG. 14.

FIGS. 14 and 15 are views of an embodiment suction assembly 20 that includes a suction cup body 30, a structural ring 50, a bellows or sealing membrane 60, and a connector fitting 70. Suction cup body 30 forms a chamber 36 within the suction cup, and preferably is an open celled rubber sponge having a density of 0.25. An example of the density the foam that can be used is 300 kg/m^3. The body 30 may also be a hybrid material such as natural latex enhanced urethane foam or block copolymers. The durometer of the foam can range from Shore 25A to 65A. Preferably, the compression set at warehouse temperature, 10 C to 35 C, should be less than 20%, such as less than 5%.

The material of suction cup body 30, in many circumstances, may be chosen for its ability to easily conform to an object during the grasping phase and to elastically regain its un-deformed shape after actuation. Thus, many other materials may be used, such as (for non-limiting examples) polymeric foams such as nitrile rubber foam, polyurethane foam, silicone foam, polychloroprene foam (neoprene), and the like. Preferably, the material of suction cup body 30 is easily compressible.

Structural ring 50 may be formed of a thin 316 stainless spring steel. In some examples, the ring 50 may be an annealed 303 SS, and in other examples a urethane having a shore 90 (A) durometer. Ring 50 is attached to a proximal surface 24 of suction cup body 30, such as by an adhesive. Any attachment means may be employed to couple ring 50 and suction cup body 30 together. The term "couple" is used broadly herein to refer to structures being relatively held together, either in direct contact with one other or indirectly by having other components or materials between the structures.

Sealing membrane 60 preferably is a disk formed of an impermeable sheet, film, or fabric that is coupled to and sealed to ring 50 by a ring 62 of pliable, soft transition material. The material of ring 62 may include a wide variety of materials chosen for its function of adhering and sealing membrane 60 and ring 50 together without unduly increasing bending stiffness. For example, an ethyl vinyl acetate (EVA), a polyurethane, and the like may be used. Other non-limiting examples of pliable materials include elastomeric materials such as latex, rubber, and silicone. Any other means for attaching or adhering membrane 60 to ring 50, such as adhesives, mechanical fasteners (including screws, locking rings, clamps, and the like), sewing, melting or welding, and the like, may be employed.

Sealing membrane 60 extends from an inboard rim of ring 50 and includes openings 78 through which vacuum pressure is transmitted. A connector 70 includes an elongate metal fitting 80 that is attached to sealing membrane 60 by screws. Fitting 80 can attach to any corresponding structure of the end effector.

Openings 78 as illustrated in the figures are not radially symmetrical and are sized to fit through aperture 180 in actuator 110. Sheet 60 is formed of a pliable material, such as a fabric, and thus the asymmetrical openings do not materially affect the isotropic stiffness of suction cup assembly 20, apart from the metal connector 70. A Cordura™ nylon of 600 to 1,000 is an example of a product that may be employed to form the sheet of material. Alternatively or in combination, a synthetic leather materials such suede which may have similar properties in all directions may be used. Additionally, materials that have different properties in certain directions, such as elongation, may be used. An example would be 2× greater elongation in the x-axis vs the y-axis.

As illustrated in the drawing of suction cup 20, ring 50 is thin to promote ease of deformation and conformance. The thickness of ring 50 can be chosen according to the particular parameters of the application, such as the magnitude of the vacuum pressure, diameter of the suction cup body, desired stiffness, and the like. A range of 0.0005 inches to 0.002 inches (one half to two thousandths) are examples of a steel ring thickness for a suction cup of two to five inches in diameter. For a polymer ring such as urethane, the range may be 0.010 to 0.150 depending on the mass of the object being captured and manipulated, and other parameters of the particular application.

Figure 16:
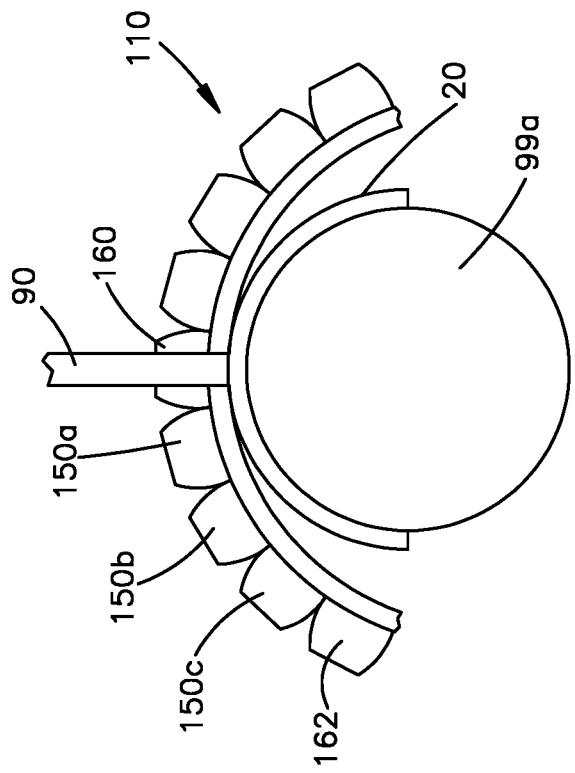
FIG. 16 is a schematic, end view illustration of a gripper engaging a cylindrical object.

FIG. 16 partially schematically illustrates the gripper 10 in an actuated position. Actuator 110 is actuated from the rest, flat position shown in FIG. 3A and suction cup 20 is shown actuated to grasp a cylindrical object 99*a*, which is shown in end view in FIG. 16. In practice, an arm (such as a gantry arm, a robot arm shown in FIG. 17, or any other mechanism) moves gripper 10 into position relative to an object to be grasped. Pressurized air is applied to actuator 110, causing air chambers 156 to expand the walls into bulges, thereby bending constraining layer 120 into an arcuate shape. Preferably, suction cup 20 is attached to actuator 110 only via fitting 80, and sheet 60 is not attached to constraining layer lower surface 122, and are permitted to move freely relative to one another.

As actuator 110 bends toward its actuated position, distal ends of the actuator contact the corresponding distal portions of suction cup 20 to bend or deflect suction cup 20. The magnitude of vacuum pressure in chamber 36 and the low stiffness of the suction cup assembly (about any axis A1, A2, etc., as illustrated in FIG. 14) induces suction cup assembly 20 to wrap around and conform (by taking or approximately taking the shape) to the cylindrical surface of object 99*a*. In this regard, the flexibility of suction cup 20 enables the profile of suction cup 20 to form a saddle shape, which in the end view of FIG. 9 is illustrated as a segment of a circular shape. Suction cup body 30 compresses and ring 50 deflects in a continuously varying profile to accommodate the curved cylinder during the engagement process.

In some embodiments, a control system is provided for the functional aspects of the gripper 10. The control system may receive data from one or more sensors (for example, optical, contact, proximity, etc.) disposed on and/or around the end effector/gripper 10. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two-dimensional image of the item showing a feature may allow an identification of a respective surface. If the two-dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

Control may also be via mechanical analog control where when vacuum is achieved. For example, when the cup captures the target object, the vacuum pressure at the end of arm tool increases rapidly. An analog mechanical vacuum valve may be employed to respond to the change in vacuum and freeze the shape of the suction cup once capture is achieved. Alternately the change in pressure at capture can be used to freeze motor motion once capture is achieved.

Alternately, if electric motors are used, the current into the motor will also indicate when capture is achieved. As the cup wraps around the captured object, further deformation of the cup is only possible by rapidly increasing the force applied by the motors. More force will not increase the capture, but may damage the cup and the captured article to be manipulated. When both vacuum is achieved and the force (current into the motors) begins to increase, the motors can be configured freeze to prevent damage to the captured target article.

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The end effector structure and function are described herein by referring to advantages and specific examples or embodiments. The present invention is not limited to the advantages explained herein, nor to the structure or function of the examples or embodiments. Moreover, the text is intended to describe the specific embodiments shown in the figures. The structure and function shown and described is intended only for example. For non-limiting examples, the quantity and shape of air bladders and corresponding wall thicknesses and heights, the parallel orientation of the bladders, symmetry about an axis, circular profile of the actuator, and like parameters are provided merely for illustration, and are not intended to be limiting unless explicitly stated in the claims. And the function descriptions are not intended to limit the scope of the invention. Rather, it is intended that the invention be given the full scope of the plain meaning of the claims.

What is claimed is:

1. An actuator for a gripper of a robotic arm, the actuator comprising:
   a constraining layer having a rest position in which the constraining layer has a circular shape and an actuated position in which the constraining layer is arcuate; and
   a compliant air bladder assembly adjacent the constraining layer, the compliant air bladder assembly including elongate air bladders that are parallel to one another along chords of the circular constraining layer, each air bladder being configured to expand, upon pressurization, to contact at least one adjacent elongate air bladder to cause the constraining layer to bend from the rest position toward the actuated position,
   wherein at least one of the constraining layer or the compliant air bladder assembly is resilient such that the constraining layer returns to the rest position from the actuated position upon depressurization of the elongate air bladders.

2. The actuator of claim 1, wherein each of the elongate air bladders defines an air chamber between opposing elongate walls, the opposing elongate walls being configured to expand upon pressurization of the air chamber, and the expanded elongate walls being configured to contact at least one adjacent expanded elongate wall of the adjacent elongate air bladder to cause the constraining layer to bend to the actuated position.

3. The actuator of claim 2, wherein the elongate walls are mutually parallel in the rest position, and wherein each elongate air bladder includes a cap at an upper end of the elongate walls of the air bladder.

4. The actuator of claim 3, wherein the compliant air bladder assembly includes at least one plenum in fluid communication with the elongate air bladders.

5. The actuator of claim 4, wherein the at least one plenum and the cap of each air bladder are formed of a unitary hyper-elastic material.

6. The actuator of claim 1, further defining an aperture configured to receive a fitting to retain an end of the robotic arm.

7. The actuator of claim 1, wherein the constraining layer has a planar underside surface configured to resist deformation.

8. A gripper of a robotic arm, comprising:
   an actuator comprising:
      a constraining layer having a rest position and an actuated position in which the constraining layer is arcuate; and
      adjacent, elongate, compliant air bladders located above the constraining layer, each air bladder being configured to expand, upon pressurization, to contact an adjacent wall of an air bladder to cause the constraining layer to bend from the rest position toward the actuated position; and
   a suction assembly defining an aperture and configured to be moved from a rest position, and to conform to and grasp an object upon application of vacuum to the suction assembly,
   wherein at least some portions of the constraining layer are not affixed to the suction assembly, and the suction assembly is adapted to resiliently return to the rest position upon release of the vacuum to the suction assembly independent of resilience of the actuator.

9. The gripper of claim 8, wherein the suction assembly comprises:
   a flat, resilient ring;
   a cup attached to the ring; and
   a planar, flexible membrane attached to the ring and extending radially inwardly from the ring, wherein the suction assembly is configured to resiliently return to the rest position upon disengagement with the object.

10. The gripper of claim 9, wherein the suction assembly comprises a vacuum valve configured to maintain a shape of the cup once the object is engaged with the suction assembly.

11. The gripper of claim 9, wherein the suction assembly further comprises a sealing membrane coupled to the ring.

12. The gripper of claim 8, wherein the suction assembly includes a flat, resilient ring that is configured to bias a cup of the suction assembly toward a rest position such that the suction assembly is adapted to resiliently return to the rest position upon release of the vacuum.

13. The gripper of claim 8, wherein the constraining layer includes a contact surface adapted for contacting an upper surface of the suction assembly.

14. The gripper of claim 8, wherein a fitting is configured to extend through the aperture to connect the gripper to an end of the robotic arm.

15. The gripper of claim 8, further comprising a controller configured to determine a surface shape of the object using at least one of one or more images of the object, one or more attributes of the object, or one or more features associated with surfaces of the object.

16. The gripper of claim 15, wherein:

the one or more attributes of the object comprise at least one of a dimension of the object, a weight of the object, or a center of gravity of the object, and the one or more features associated with surfaces of the object comprise at least one of a surface label, a surface characteristic, or a material characteristic.

17. A method of grasping an object using a gripper, the method comprising:

positioning the gripper relative to an object the gripper comprising:

an actuator comprising:

a constraining layer having a rest position and an actuated position; and adjacent, elongate, compliant air bladders located above the constraining layer, each air bladder being configured to expand, upon pressurization, to contact an adjacent wall to cause the constraining layer to bend from the rest position toward the actuated position; and a suction assembly defining an aperture and configured to be moved from a rest position, and to conform to an object, wherein said positioning occurs while both the actuator and the suction assembly are in the rest position;

pressurizing the air bladders of the actuator such that the constraining layer bends to contact an upper surface of the suction assembly to cause bending of the suction assembly; and applying vacuum to an interior of the suction assembly such that the suction assembly grasps the object by the vacuum.

18. The method of claim 17, further comprising:

lifting the object after grasping the object by the vacuum; and depressurizing the air bladders and releasing vacuum in the suction assembly, thereby (i) releasing the object and (ii) enabling the actuator to resiliently return to the rest position and enabling the suction assembly to resiliently return to the rest position independently from the resilient return of the actuator to the rest position.

* * * * *